US012033815B2

(12) United States Patent
Wang

(10) Patent No.: US 12,033,815 B2
(45) Date of Patent: Jul. 9, 2024

(54) KEY STRUCTURE OF KEYBOARD

(71) Applicant: VOYETRA TURTLE BEACH, INC., White Plains, NY (US)

(72) Inventor: Wei Chuan Wang, New Taipei (TW)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

(21) Appl. No.: 17/465,672

(22) Filed: Sep. 2, 2021

(65) Prior Publication Data

US 2022/0068576 A1 Mar. 3, 2022

(30) Foreign Application Priority Data

Sep. 3, 2020 (CN) ........................ 202021896863.9

(51) Int. Cl.

*H01H 13/70* (2006.01)
*H01H 3/12* (2006.01)
*H01H 13/7073* (2006.01)
*H01H 13/86* (2006.01)

(52) U.S. Cl.

CPC .......... *H01H 13/7073* (2013.01); *H01H 3/12* (2013.01); *H01H 13/86* (2013.01)

(58) Field of Classification Search

CPC ...... H01H 13/7073; H01H 3/12; H01H 13/86; H01H 13/06; H01H 13/14; H01H 13/88
USPC .......................................................... 200/5 A
See application file for complete search history.

(56) References Cited

U.S. PATENT DOCUMENTS

| | | | | |
|---|---|---|---|---|
| 3,855,439 | A * | 12/1974 | Hermann | H03K 17/97 310/DIG. 3 |
| 10,014,602 | B2 * | 7/2018 | Pizzato | H01R 9/2633 |
| 2019/0172661 | A1 * | 6/2019 | Hsieh | H01H 13/04 |
| 2020/0043680 | A1 | 2/2020 | Ruff | |

FOREIGN PATENT DOCUMENTS

| | | | |
|---|---|---|---|
| CN | 204067118 | U | 12/2014 |
| CN | 108400042 | A | 8/2018 |
| WO | 2016001832 | A1 | 1/2016 |

* cited by examiner

*Primary Examiner* — Renee S Luebke
*Assistant Examiner* — Iman Malakooti
(74) *Attorney, Agent, or Firm* — Sheppard Mullin Richter & Hampton LLP

(57) ABSTRACT

A keyboard key structure comprises a lower casing, an upper casing, a press shaft and a spring; the lower casing comprises a base and two hooks extend upward from the base; the upper casing comprises a top wall, an annular peripheral wall around the periphery of the top wall, and a through opening from the top wall, and is further provided with two see-through slots arranged on both sides of the through opening and the hooks are buckled in the see-through slots so that the lower casing and the upper casing are assembled vertically to form an internal cavity; the press shaft is contained in the cavity, and the top of the press shaft passes through the through opening; and the spring is contained in the cavity and elastically supported between the lower casing and the press shaft.

7 Claims, 4 Drawing Sheets

KEY STRUCTURE OF KEYBOARD

REFERENCE TO RELATED APPLICATION

The present application claims priority to Chinese Patent Application No. 202021896863.9, filed Sep. 3, 2020 and titled "KEY STRUCTURE OF KEYBOARD," which is incorporated herein by reference in its entirety.

TECHNICAL FIELD

The present utility model relates to a key structure, particularly to a keyboard key structure.

BACKGROUND ART

Following the popularization of e-sports games, players have showed higher requirements for the specifications of video game devices, leading to the emergence of mechanical keyboards on the market. The mechanical keyboards have mechanical keys with a long pressing stroke, an accurate touch and pressing feel, and a long service life.

A conventional mechanical key comprises an upper casing, a lower casing, a press shaft, a spring and a cap; the upper casing and the lower casing are mutually assembled to form an internal cavity, the press shaft and the spring are contained in the cavity, the top of the press shaft is exposed in the upper casing, the spring is elastically supported between the bottom of the press shaft and the lower casing, and the cap is mounted on the top of the press shaft.

However, the above-mentioned upper casing is made of plastics through injection molding, so if the assembly structure between the upper casing and the lower casing is too complex, it will be difficult to demold the upper casing or the appearance design will be limited, resulting in a high production cost, a low yield and other problems.

In view of this, the creator focused on the above-mentioned existing technology, did in-depth research, applied theories and tried utmost to solve the above problems, which became the goal of the improvement of the present creation.

SUMMARY OF THE UTILITY MODEL

The present utility model provides a keyboard key structure. The see-through slots of the upper casing are easily demolded during the plastics injection molding process so that the keyboard key structure has the advantages of freedom of appearance design of the upper casing, saving of finished products and improvement of yield.

In an embodiment of the present utility model, the present utility model provides a keyboard key structure, comprising: a lower casing, comprising a base from which two hooks extend upward; an upper casing, comprising a top wall, an annular peripheral wall around the periphery of the top wall, and a through opening from the top wall, and further provided with two see-through slots, which are arranged on both sides of the through opening and in which the hooks are buckled so that the lower casing and the upper casing are assembled vertically to form an internal cavity; a press shaft, which is contained in the cavity, and the top of which passes through the through opening; and a spring, which is contained in the cavity and elastically supported between the lower casing and the press shaft.

In this way, the assembly structure of the lower casing and the upper casing is simple and the see-through slots of the upper casing are easily demolded during the plastics injection molding process, so the design size of the upper casing can be reduced accordingly, and the appearance design of the upper casing is also relatively free and not restricted so that the keyboard key structure has the advantages of freedom of appearance design of the upper casing, saving of finished products and improvement of yield.

DESCRIPTION OF SIGNS IN THE ACCOMPANYING DRAWINGS

10: keyboard key structure;
1: lower casing;
11: base;
12: hook;
121: up-right piece;
122: bump;
13: convex column;
2: upper casing;
21: top wall;
211 top surface;
22: annular peripheral wall;
221: inner wall surface;
23: through opening;
24: see-through slot;
241: bottom wall;
3: press shaft;
31: stopper;
4: spring;
s: cavity.

DETAILED DESCRIPTION OF THE EMBODIMENTS

The detailed description and technical content of the present utility model will be illustrated by referring to accompanying drawings below, but the accompanying drawings are for description only and not for limiting the present utility model.

Figure 1:
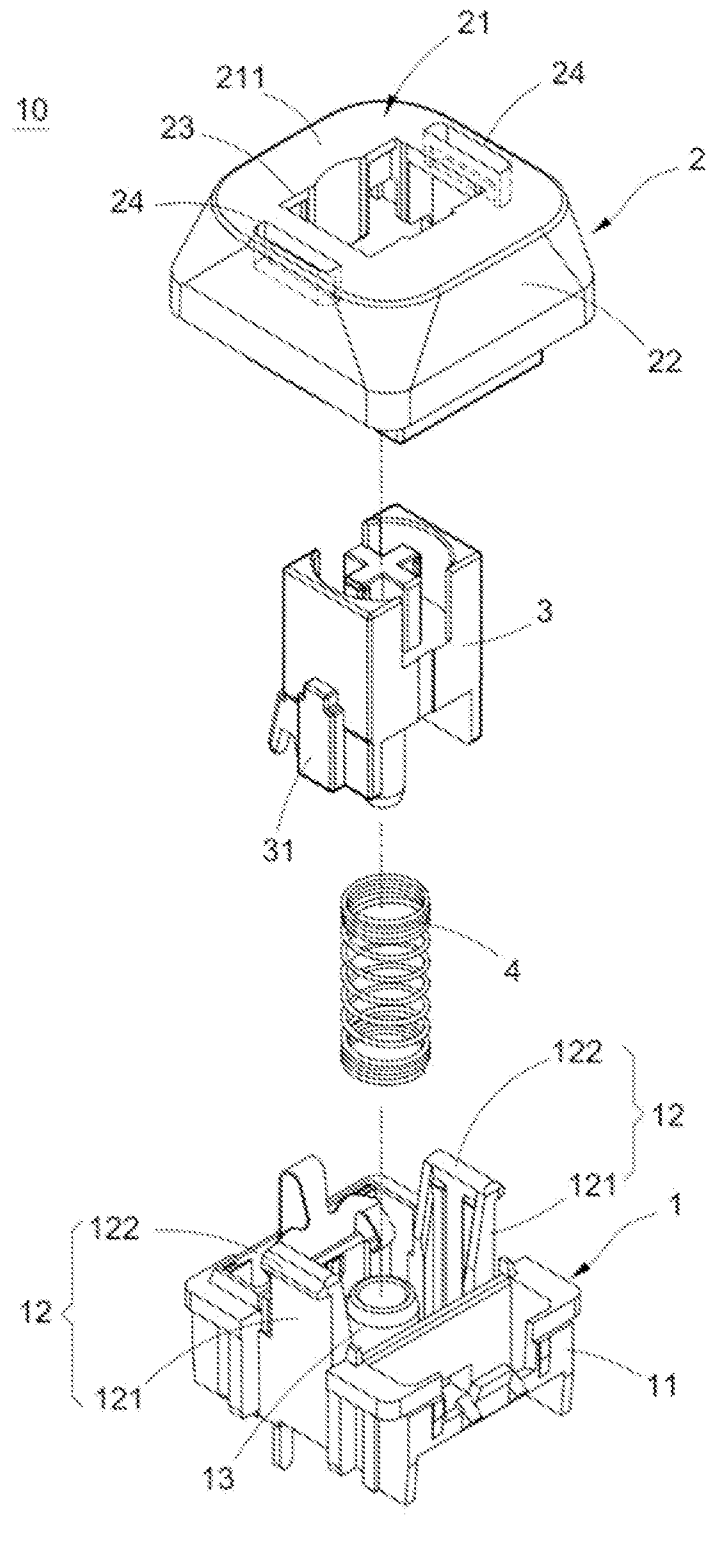
FIG. 1 is a three-dimensional exploded view of a keyboard key structure provided by the present utility model.
Figure 2:
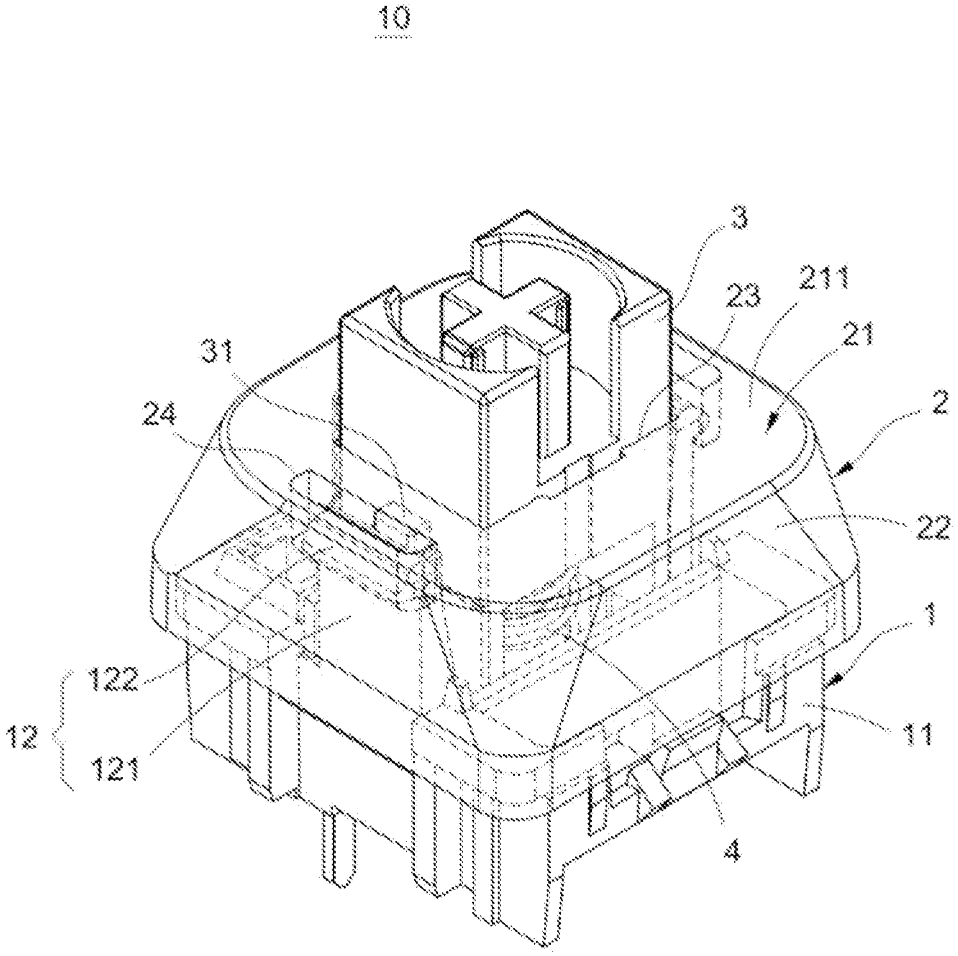
FIG. 2 is a three-dimensional combination diagram of a keyboard key structure provided by the present utility model.
Figure 3:
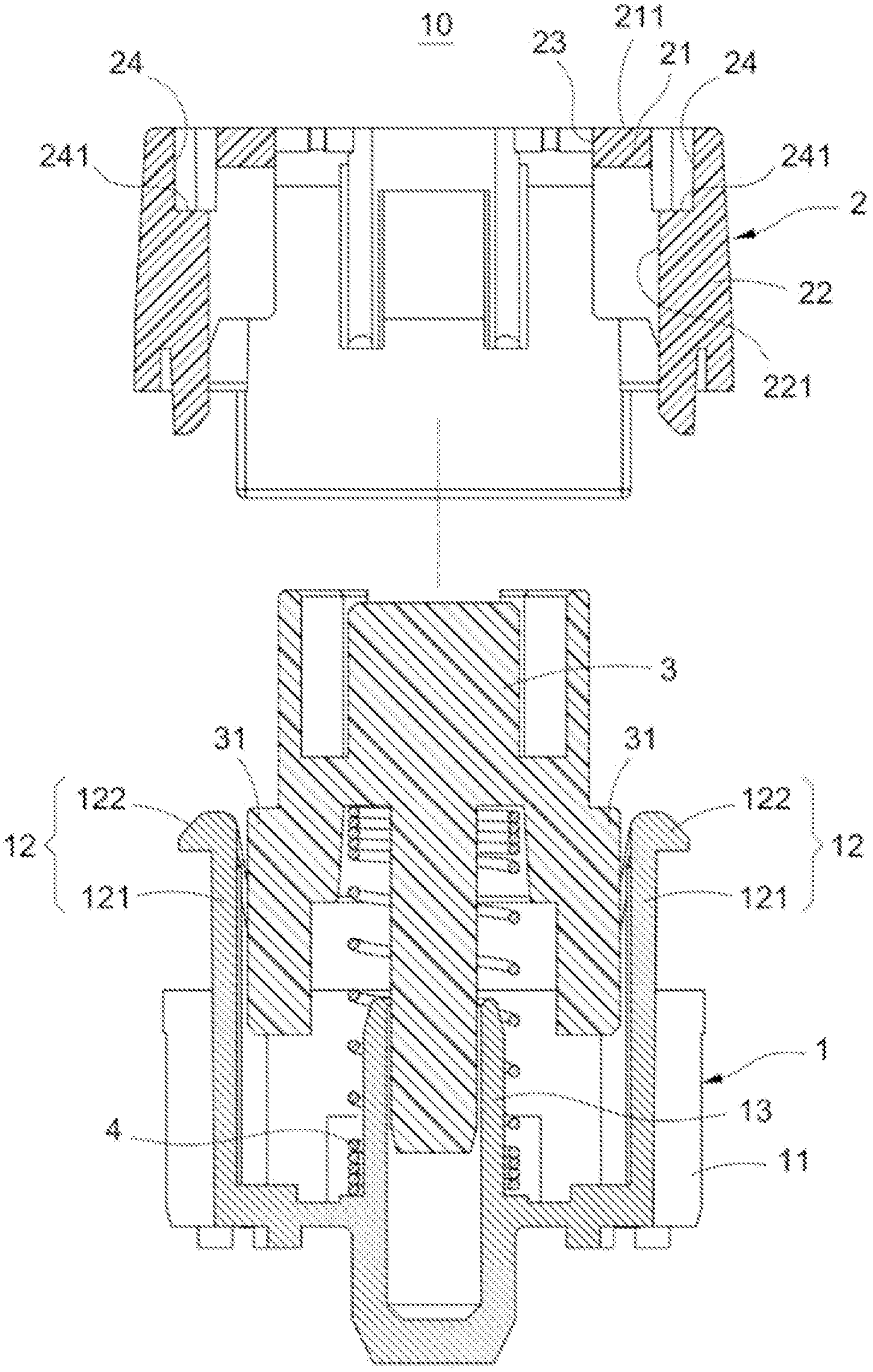
FIG. 3 is a sectional exploded view of a keyboard key structure provided by the present utility model.
Figure 4:
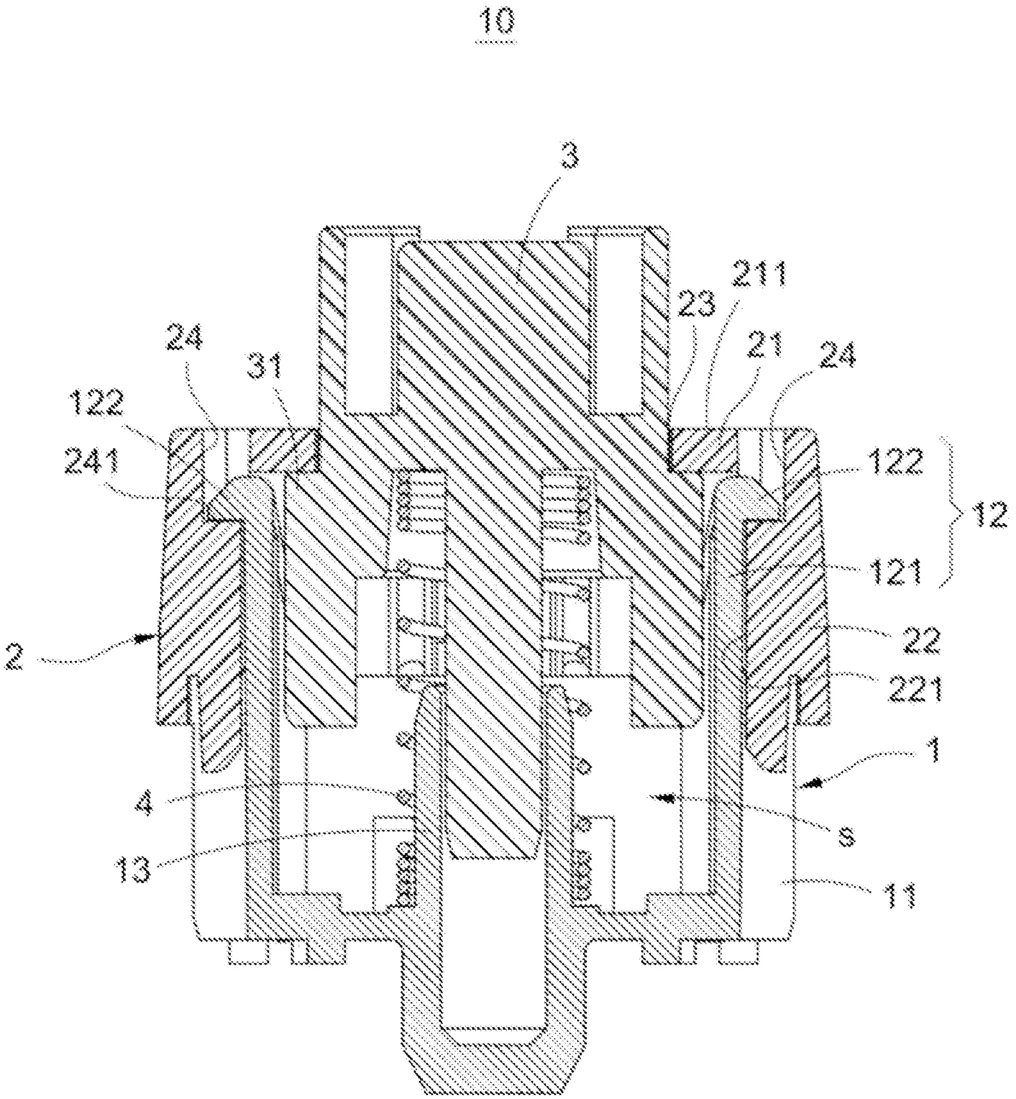
FIG. 4 is a sectional combination diagram of a keyboard key structure provided by the present utility model.

Please refer to FIG. 1 to FIG. 4. The present utility model provides a keyboard key structure. The keyboard key structure 10 mainly comprises a lower casing 1, an upper casing 2, a press shaft 3 and a spring 4.

The lower casing 1 comprises a base 11, the base 11 extends upward with two hooks 12 and a convex column 13, each hook 12 comprises an up-right piece 121 and a bump 122 extending from an end of the up-right piece 121, and the convex column 13 is arranged between the two up-right pieces 121.

The upper casing 2 comprises a top wall 21, an annular peripheral wall 22 around the periphery of the top wall 21, and a through opening 23 from the top wall 21, and is further provided with two see-through slots 24, which are arranged on both sides of the through opening 23, and the hooks 12 are buckled in the see-through slots 24 so that the lower casing 1 and the upper casing 2 are assembled vertically to form an internal cavity s.

Detailed description is as follows. One end of each see-through slot 24 passes through the top surface 211 of the top wall 21 and the other end passes through the inner wall surface 221 of the annular peripheral wall 22, and the bottom of each see-through slot 24 has a bottom wall 241.

When the upper casing 2 corresponds to a cover cap of the lower casing 1, each bump 122 will be contained in a see-through slot 24 and be stopped and positioned by a bottom wall 241, so that the lower casing 1 and the upper casing 2 are firmly assembled together.

Further, the upper casing 2 is made of a light-transmitting material, so that when the keyboard key structure 10 is installed with a light-emitting component (not shown in the figure), the light source of the light-emitting component (not shown in the figure) can be seen through the upper casing 2.

The press shaft 3 is contained in the cavity s, the top of the press shaft 3 passes through the through opening 23 and two stoppers 31 extend on both sides of the press shaft 3. When the press shaft 3 protrudes toward the through opening 23, the two stoppers 31 will be stopped by the top wall 21 to prevent the press shaft 3 from escaping out of the cavity s via the through opening 23.

The spring 4 is contained in the cavity s and elastically supported between the lower casing 1 and the press shaft 2. The spring 4 in this embodiment is a spiral spring, and is sleeved on the convex column 13.

FIG. 1 to FIG. 4 show the use state of the keyboard key structure 10 provided by the present utility model. Two hooks 12 extend from the lower casing 1, the upper casing 2 is provided with two see-through slots 24 and each hook 12 is buckled in a see-through slot 24 so that the lower casing 1 and the upper casing 2 are firmly assembled vertically.

In this way, the assembly structure of the lower casing 1 and the upper casing 2 is simple and the see-through slots 24 of the upper casing 2 are easily demolded during the plastics injection molding process, so the design size of the upper casing 2 can be reduced accordingly, and the appearance design of the upper casing 2 is also relatively free and not restricted so that the keyboard key structure 10 has the advantages of freedom of appearance design of the upper casing 2, saving of finished products and improvement of yield.

What is claimed is:

1. A keyboard key structure, wherein the keyboard key structure comprises:

a lower casing, comprising a base from which two hooks extend upward;

an upper casing, comprising a top wall, an annular peripheral wall around the periphery of the top wall, and a through opening from the top wall, and further provided with two slots, wherein each slot is centered with the through opening and extends downward from the top wall so as not to pass through a side wall of the upper casing, and wherein each slot is on opposite sides of the through opening, wherein the hooks are buckled in the slots so that the lower casing and the upper casing are assembled vertically to form an internal cavity;

a press shaft, which is contained in the cavity, and the top of which passes through the through opening; and a spring, which is contained in the cavity and elastically supported between the lower casing and the press shaft.

2. The keyboard key structure according to claim 1, wherein each slot passes through a top surface of the top wall and an inner wall surface of the annular peripheral wall.

3. The keyboard key structure according to claim 2, wherein each hook comprises an up-right piece and a bump extending from an end of the up-right piece, the bottom of each slot has a bottom wall, and each bump is contained in a slot and is stopped and positioned by a bottom wall.

4. The keyboard key structure according to claim 3, wherein the base extends upward with a convex column arranged between the two up-right pieces, and the spring is a spiral spring and is sleeved on the convex column.

5. The keyboard key structure according to claim 1, wherein two stoppers extend on both sides of the press shaft, and when the press shaft protrudes toward the through opening, the two stoppers are stopped by the top wall.

6. The keyboard key structure according to claim 1, wherein the upper casing is made of a light-transmitting material.

7. The keyboard key structure according to claim 1, wherein each slot extends downward perpendicular to the top wall.

* * * * *